(12) United States Patent
Woolsey (10) Patent No.: US 12,006,716 B2
(45) Date of Patent: Jun. 11, 2024

(54) INFLATABLE VEHICLE AWNING

(71) Applicant: Russell M. Woolsey, Bingen, WA (US)

(72) Inventor: Russell M. Woolsey, Bingen, WA (US)

( * ) Notice: Subject to any disclaimer, the term of this patent is extended or adjusted under 35 U.S.C. 154(b) by 109 days.

(21) Appl. No.: 17/826,863

(22) Filed: May 27, 2022

(65) Prior Publication Data
US 2022/0389734 A1   Dec. 8, 2022

Related U.S. Application Data

(60) Provisional application No. 63/202,247, filed on Jun. 2, 2021.

(51) Int. Cl.
| | | |
|---|---|---|
| *E04H 15/08* | (2006.01) | |
| *B63B 17/02* | (2006.01) | |
| *E04F 10/02* | (2006.01) | |
| *E04H 15/20* | (2006.01) | |
| *A45B 19/02* | (2006.01) | |
| *B60J 5/04* | (2006.01) | |

(52) U.S. Cl.
CPC .............. *E04H 15/08* (2013.01); *B63B 17/02* (2013.01); *E04F 10/02* (2013.01); *E04H 15/20* (2013.01); *A45B 19/02* (2013.01); *B60J 5/0494* (2013.01); *E04H 2015/204* (2013.01)

(58) Field of Classification Search
CPC ........ A45B 19/02; B60J 5/0494; E04F 10/02; E04H 2015/201; E04H 2015/204; E04H 15/08; E04H 15/20
USPC ........ 135/88.01, 88.07, 88.08, 117; 296/152, 296/163, 99.1
See application file for complete search history.

(56) References Cited

U.S. PATENT DOCUMENTS

| | | | | |
|---|---|---|---|---|
| 1,964,818 | A * | 7/1934 | Hood | E04H 15/20 52/2.21 |
| 2,682,274 | A * | 6/1954 | Miller | E04F 10/02 52/2.13 |
| 2,827,909 | A * | 3/1958 | Platzke | A45B 19/02 441/40 |
| 2,946,337 | A * | 7/1960 | Wolshin | E04H 15/20 52/2.21 |
| 2,948,288 | A * | 8/1960 | Nelson | B60P 3/343 135/93 |
| 3,934,924 | A * | 1/1976 | Diliberti | E04H 15/08 5/119 |
| 4,959,901 | A * | 10/1990 | Parish | E04H 15/20 135/900 |
| 5,007,211 | A * | 4/1991 | Ouellet | B65G 69/008 52/173.2 |
| 5,400,813 | A * | 3/1995 | Swan, Jr. | E04H 15/08 135/88.07 |

(Continued)

FOREIGN PATENT DOCUMENTS

| | | |
|---|---|---|
| GB | 2378925 A | 2/2003 |
| GB | 2424425 A | 9/2006 |
| GB | 2490003 A | 10/2012 |

*Primary Examiner* — Robert Canfield
(74) *Attorney, Agent, or Firm* — Kolitch Romano Dascenzo Gates LLC (57) ABSTRACT

Vehicle awnings comprise an inflatable frame assembly comprising a main frame member that defines a space, a left supporting frame member, and a right supporting frame member; a canopy operatively coupled to the main frame member and spanning the space; and an attachment system for attaching the vehicle awning to a vehicle.

15 Claims, 9 Drawing Sheets

(56) References Cited

U.S. PATENT DOCUMENTS

| | | | |
|---|---|---|---|
| 5,570,544 A * | 11/1996 | Hale | E04H 15/20 52/2.18 |
| 6,209,149 B1 * | 4/2001 | Song | E04H 15/20 4/503 |
| 6,318,390 B1 * | 11/2001 | Innis | A45B 19/02 52/2.13 |
| 6,606,826 B2 * | 8/2003 | Nagle | E04H 15/20 135/900 |
| 7,086,684 B2 | 8/2006 | Glaser et al. | |
| 7,178,536 B2 | 2/2007 | Holtkamp | |
| 7,290,552 B1 * | 11/2007 | Eisbrenner | E04H 15/04 135/117 |
| D622,414 S | 8/2010 | Cropley | |
| 8,267,105 B1 | 9/2012 | Denmark, Jr. | |
| D698,941 S | 2/2014 | Cropley | |
| 8,876,189 B1 | 11/2014 | Williams | |
| 9,080,374 B2 | 7/2015 | Gavish | |
| 9,353,529 B2 | 5/2016 | Richmeier | |
| D770,358 S | 11/2016 | Fernandez et al. | |
| D813,782 S | 3/2018 | Cropley et al. | |
| 10,323,434 B2 * | 6/2019 | Iacona | E04H 15/06 |
| D857,609 S | 8/2019 | Rohr | |
| D859,281 S | 9/2019 | Mcdonald, II et al. | |
| D863,197 S | 10/2019 | Gordon | |
| D897,930 S | 10/2020 | Macindoe | |
| D907,563 S | 1/2021 | Shi et al. | |
| D921,566 S | 6/2021 | Romer et al. | |
| D926,105 S | 7/2021 | Queener | |
| 11,202,488 B1 * | 12/2021 | Wan | E04H 6/42 |
| D964,252 S | 9/2022 | Emerson et al. | |
| D979,484 S | 2/2023 | Burgett | |
| D989,690 S | 6/2023 | Quezada | |
| D993,139 S | 7/2023 | Lynch | |
| D995,400 S | 8/2023 | Prather et al. | |
| D997,837 S | 9/2023 | Xinying et al. | |
| 2002/0163221 A1 | 11/2002 | Smith | |
| 2004/0226597 A1 * | 11/2004 | McCampbell | E04H 15/003 135/900 |
| 2011/0187152 A1 * | 8/2011 | Lin | B62J 17/08 296/181.1 |
| 2017/0254109 A1 * | 9/2017 | Colbo | B60J 7/12 |
| 2018/0038127 A1 | 2/2018 | Yang et al. | |
| 2019/0128011 A1 * | 5/2019 | Derbes | E04H 15/20 |
| 2022/0090407 A1 * | 3/2022 | Watts | B60J 7/102 |
| 2022/0111932 A1 * | 4/2022 | Mazzarelli | B63B 17/02 |
| 2022/0112739 A1 * | 4/2022 | Baek | E04H 15/54 |
| 2023/0212872 A1 * | 7/2023 | Lawson | E04H 15/56 52/2.18 |

* cited by examiner

INFLATABLE VEHICLE AWNING

RELATED APPLICATION

This application claims benefit of U.S. Provisional Patent Application No. 63/202,247, entitled "INFLATABLE VEHICLE AWNING AND CONNECTION SYSTEM," filed on Jun. 2, 2021, the complete disclosure of which is incorporated herein by reference.

FIELD

The present disclosure relates to vehicle awnings.

BACKGROUND

Existing vehicle awnings typically deploy from brackets or other hardware that is at least semi-permanently and rigidly secured to a vehicle, such as with fasteners (e.g., bolts and nuts). These awnings typically have rigid installation hardware and loose parts such as rods, poles, mounting brackets, tent stakes, and the like, and rely on support from a ground surface when deployed.

SUMMARY

Vehicle awnings according to the present disclosure comprise an inflatable frame assembly comprising a main frame member that defines a space, a left supporting frame member, and a right supporting frame member; a canopy operatively coupled to the inflatable frame assembly and spanning the space; and an attachment system for attaching the vehicle awning to a vehicle.

DESCRIPTION

Figure 1:
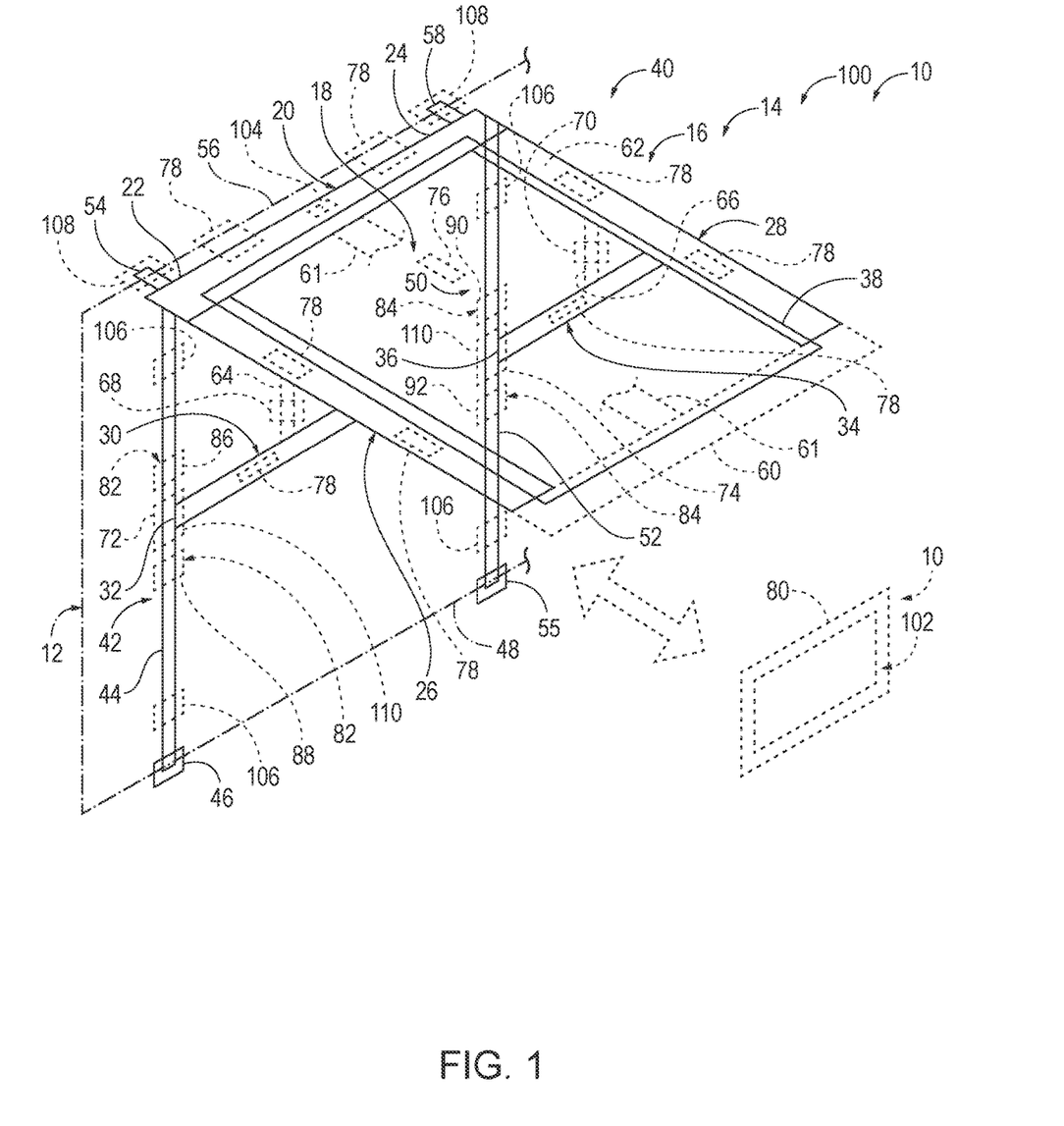
FIG. 1 is a schematic diagram representing vehicle awnings according to the present disclosure.
Figure 2:
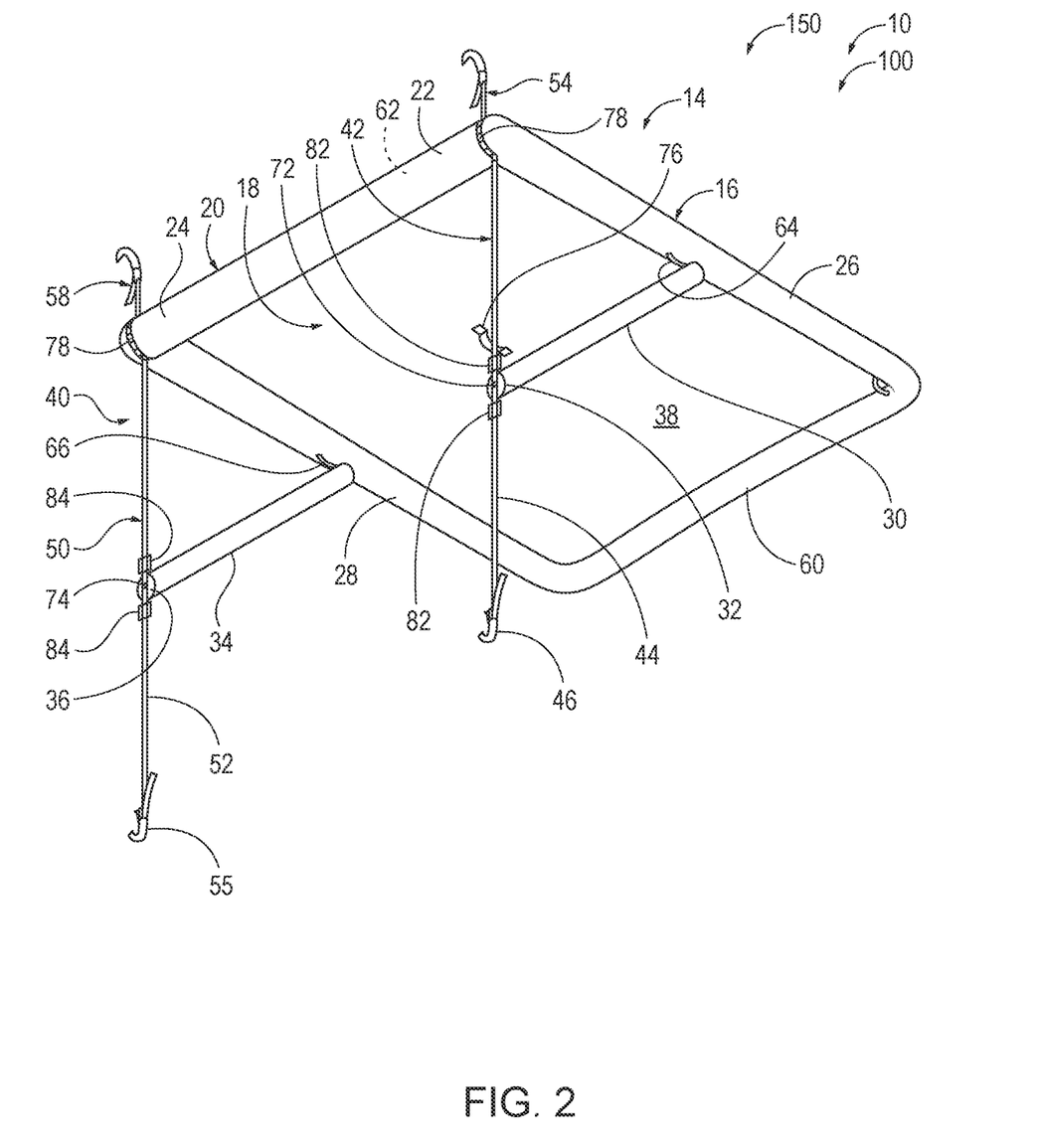
FIG. 2 is an isometric view of an example vehicle awning according to the present disclosure, shown in a deployed configuration.
Figure 3:
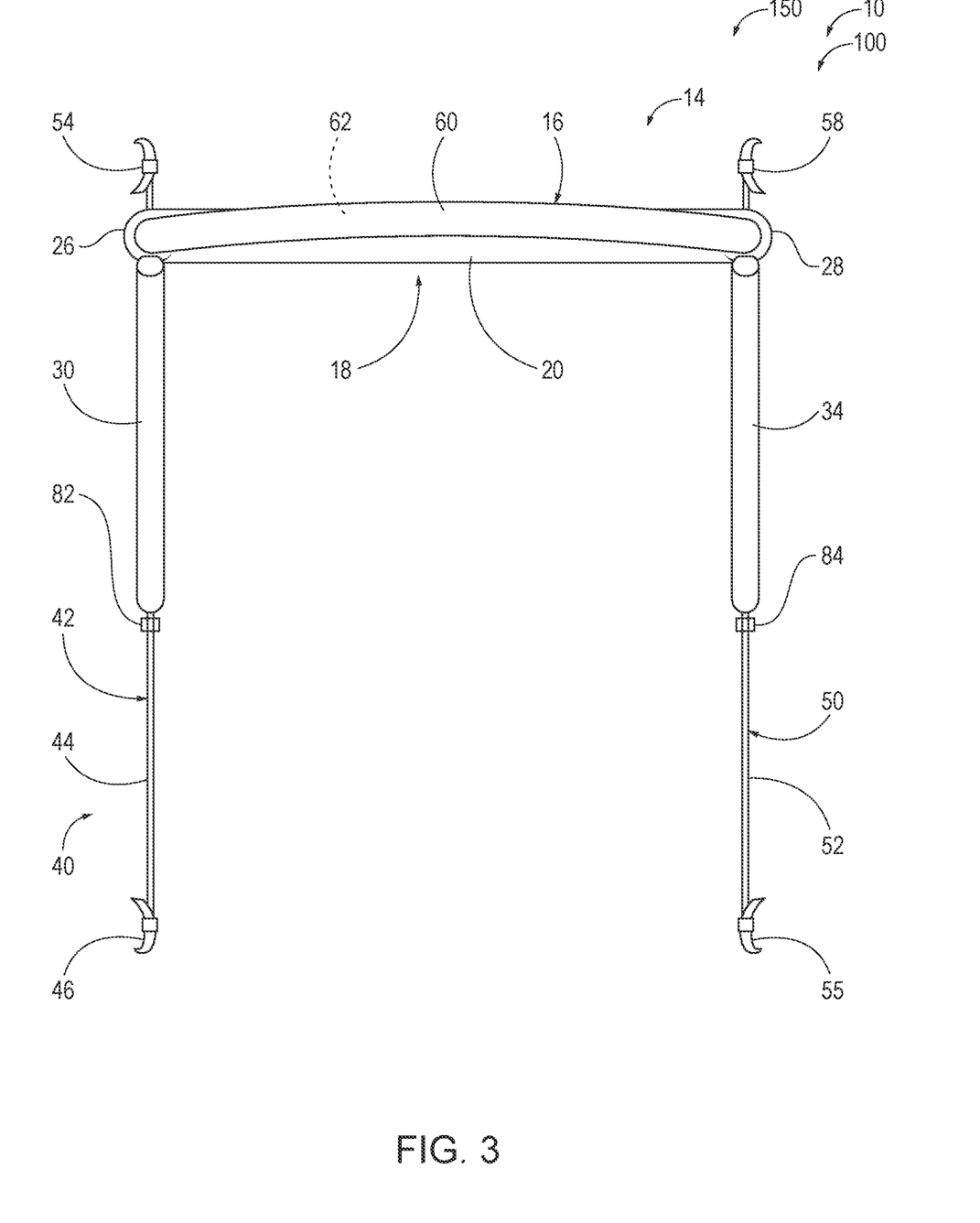
FIG. 3 is a front view of the example vehicle awning of FIG. 2.
Figure 4:
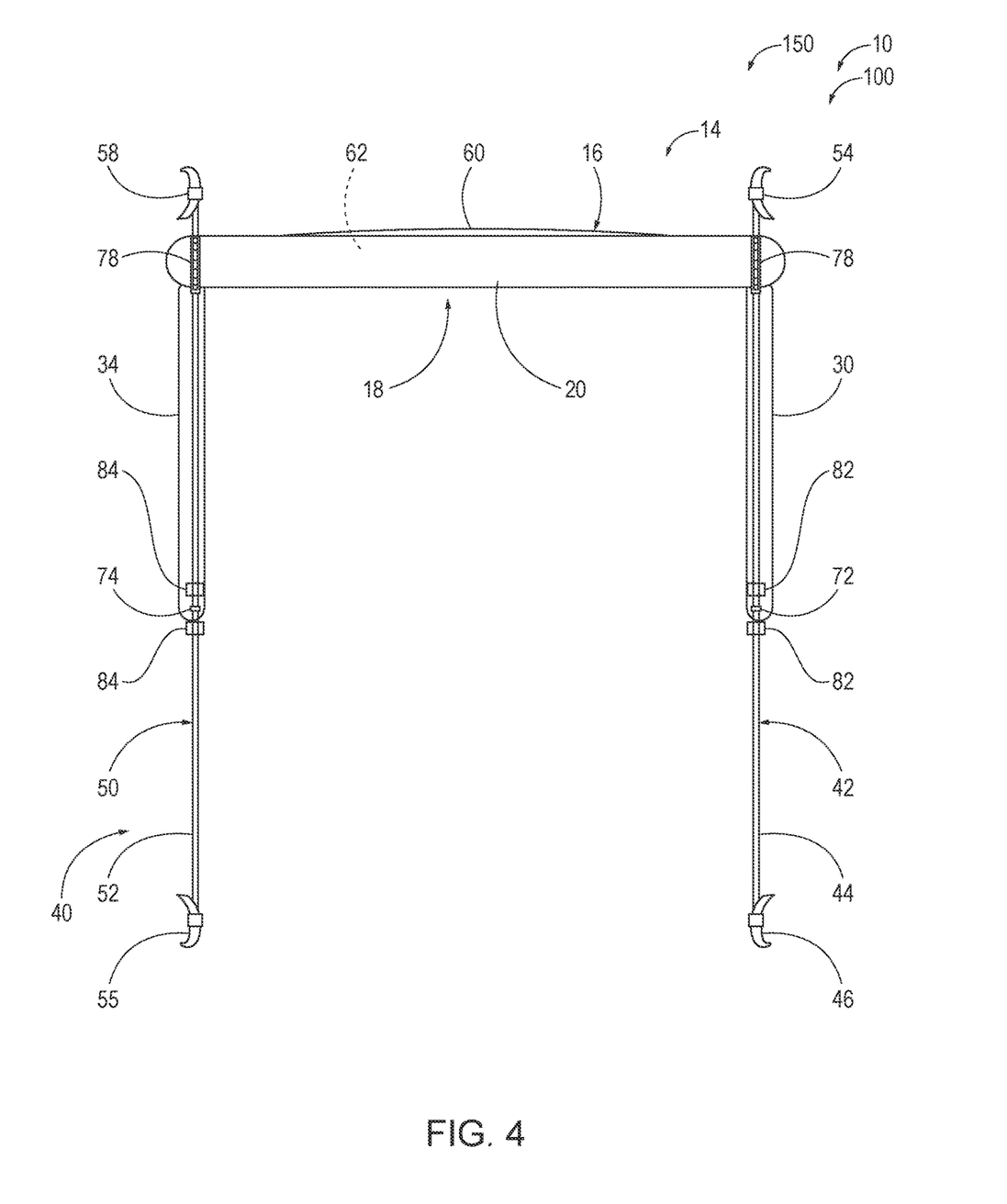
FIG. 4 is a rear view of the example vehicle awning of FIG. 2.
Figure 5:
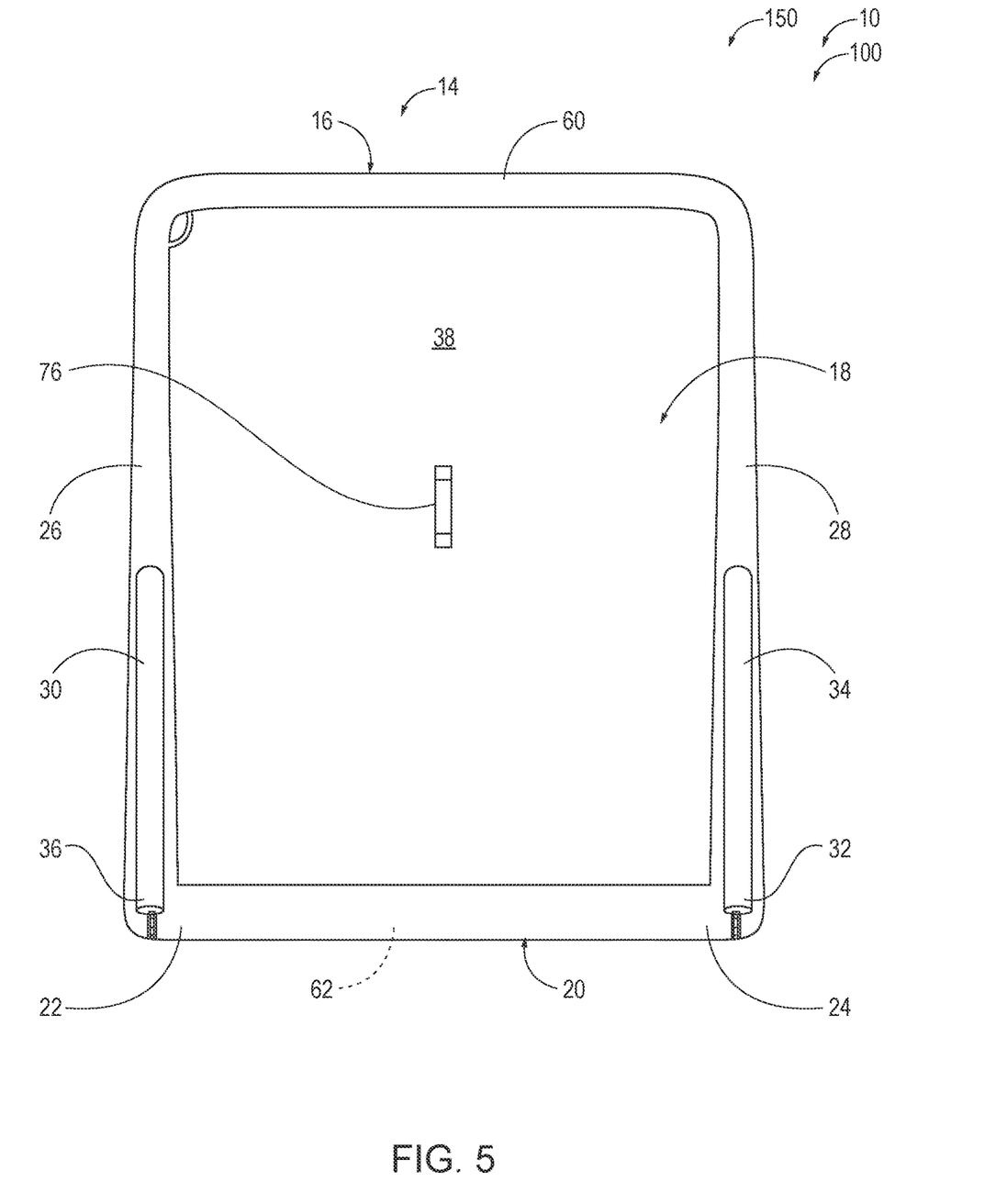
FIG. 5 is a bottom view of the example vehicle awning of FIG. 2.
Figure 6:
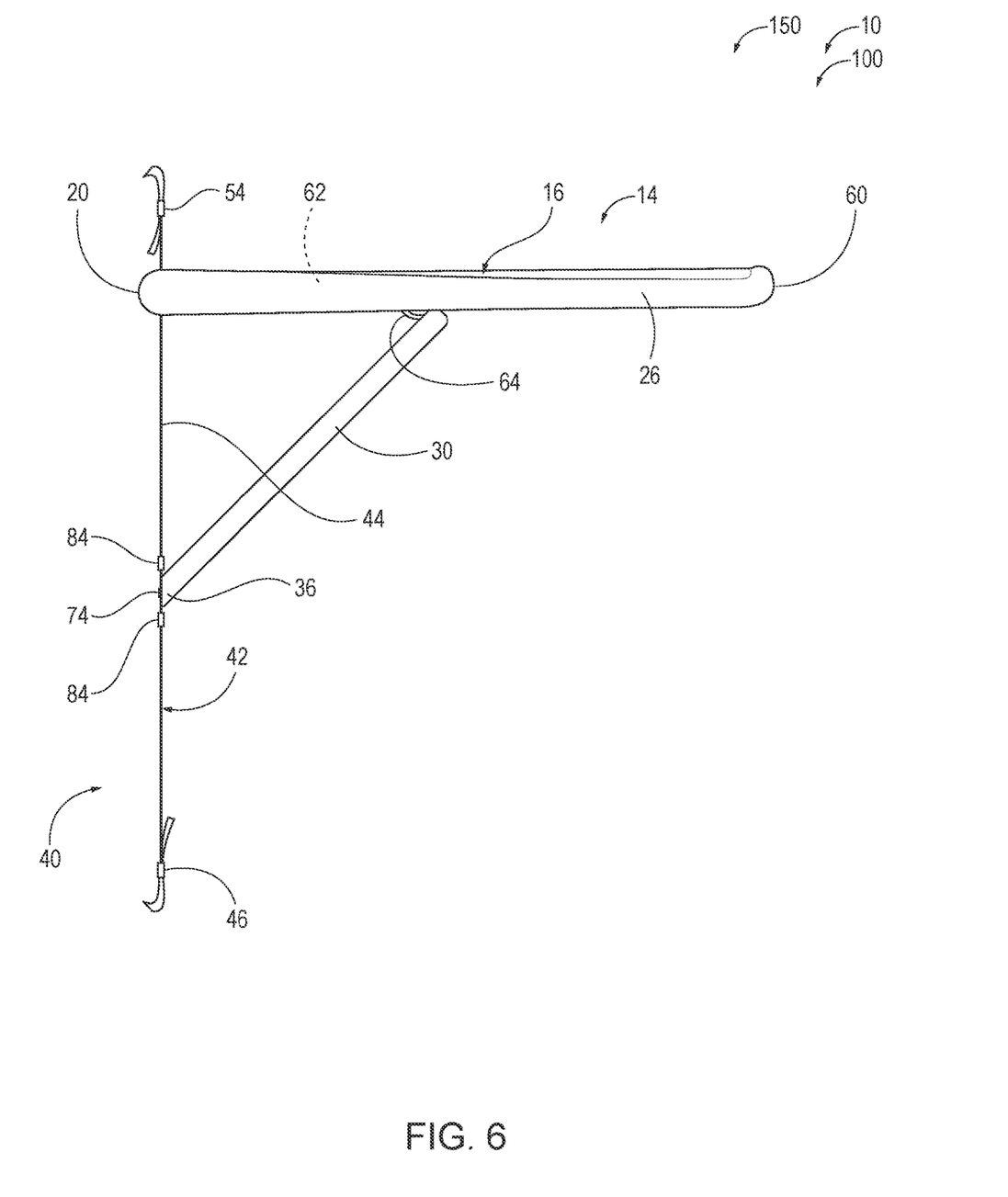
FIG. 6 is a side view of the example vehicle awning of FIG. 2.

Vehicle awnings 10 according to the present disclosure are schematically illustrated in FIG. 1. Generally, in FIG. 1, elements that are likely to be included in a given example of a vehicle awning 10 are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

As schematically illustrated in FIG. 1, generally, vehicles awnings 10 are configured for installation on a corresponding vehicle 12. When installed, vehicles awnings 10 are fully supported by the vehicle 12 and do not require direct support from a ground surface. Moreover, generally no modification to the vehicle 12 is required. That is, vehicle awnings 10 do not require that rigid or other hardware be fixed to the vehicle 12, such as with fasteners and the like, which would result in permanent alteration to the vehicle 12. That said, in some examples or some installations of some examples, vehicle awnings 10 may be at least partially coupled to aftermarket vehicle hardware, such as rooftop racks, rails, and the like. In some examples, vehicle awnings 10 are generally configured to leverage existing anchors and other structures already present on a user's vehicle, but in some instances, a user may choose or need to utilize a selectively added vehicle anchor as discussed here.

Vehicles awnings 10 comprise at least an inflatable frame assembly 14, a canopy 38, and an attachment system 40 for operatively attaching the vehicle awning 10 to the vehicle 12.

The inflatable frame assembly 14 comprises a main frame member 16, a left supporting frame member 30, and a right supporting frame member 34. The main frame member 16 defines a space 18 at least partially bound by the main frame member 16. By at least partially bound, it is meant that the main frame member 16 extends in two dimensions at least partially around the space 18. In some examples, as discussed herein, the main frame member 16 extends fully around (i.e., 360 degrees around) the space 18 in two dimensions. At least partially bound and fully bound do not mean that the space 18 is fully enclosed in three dimensions.

The main frame member 16 comprises an elongate rear segment 20 having a left end region 22 and a right end region 24, a left projecting segment 26 that extends (e.g., at an angle) from the left end region 22 of the elongate rear segment 20, and a right projecting segment 28 that extends (e.g., at an angle) from the right end region 24 of the elongate rear segment 20. The left supporting frame member 30 extends (e.g., at an angle) from the left projecting segment 26 and has a left-support distal end region 32. The right supporting frame member 34 extends (e.g., at an angle) from the right projecting segment 28 and has a right-support distal end region 36. The angles between various elements of the inflatable frame assembly 14 may differ amongst different vehicle awnings 10, such as depending on the particular size and shape of canopy 38, the type of vehicle 12 with which a vehicle awning 10 is configured, designed, or otherwise intended to be used, etc. Moreover, in some examples, one or more the angles between the various elements of the inflatable frame assembly 14 may vary during installation or depending on a particular instance of an installation of a vehicle awning 10. In particular, as discussed herein, the angles of the left and right supporting frame members relative to the left and right projecting segments may be adjusted during installation of a vehicle awning 10.

Each of the main frame member 16, the left supporting frame member 30, and the right supporting frame member 34 is configured to selectively hold a pressurized volume of air. The inflatable frame assembly 14 and its component members may be constructed in various suitable ways for holding pressurized air. In some examples, the inflatable frame assembly 14 or its component members may comprise gas-impermeable bladders (e.g., constructed of Thermoplastic Polyurethane [TPU], polyvinyl chloride [PVC], or rubber) positioned within an outer sheath (e.g., constructed of DACRON™ or other polyester fabric), and at least one valve 104 (e.g., a Boston valve or H3 valve) for selective pressurization of the inflatable frame assembly 14. In other examples, no sheath may be present. When pressurized, the main frame member 16 and/or its component members may be flexible, for example, such that at least the main frame member 16 may conform to the contour of the vehicle 12, such as the upper region 56 thereof. Depending on the construction of the inflatable frame assembly 14, when inflated, the inflatable frame assembly 14 may hold air in the 5-30 psi range; however, pressures less than and greater than this range also are within the scope of the present disclosure.

Herein, spatial terms, such as left, right, upper, lower, above, below, and the like are used to describe relative positions of components of vehicle awnings 10 and do not require that vehicle awnings 10 be installed on a particular side of a vehicle 12. Generally, such spatial terms are from the perspective of a person facing the vehicle 12 on the side of the vehicle 12 to which the vehicle awning 10 is installed.

The canopy 38 is operatively coupled to the main frame member 16 and spans the space 18. The canopy 38 may be constructed of any suitable material depending on the desired function of the canopy 38. For example, the canopy 38 may be configured to block sunlight, to block ultraviolet (UV) light, to repel rain, to shed snow, etc. An example of a suitable material is a ripstop nylon fabric. In some examples, the canopy 38 may be opaque, while in other examples, it may be translucent. The canopy 38 may be operatively coupled to the main frame member 16 using any suitable process, such as adhesives and/or stitching. In some examples, the seams between the canopy 38 and the main frame member 16 are water tight (e.g., treated with seam sealer such as urethane), so as to restrict water from entering the space 18 when the vehicle awning 10 is deployed.

The attachment system 40 comprises a lower left attachment assembly 42, a lower right attachment assembly 50, an upper left attachment assembly 54, and an upper right attachment assembly 58.

The lower left attachment assembly 42 comprises a lower left strap 44 that extends from the left end region 22 of the elongate rear segment 20 of the main frame member 16 of the inflatable frame assembly 14, and the left-support distal end region 32 of the left supporting frame member 30 is coupled to the lower left strap 44. Similarly, the lower right attachment assembly 50 comprises a lower right strap 52 that extends from the right end region 24 of the elongate rear segment 20 of the main frame member 16 of the inflatable frame assembly 14, and the right-support distal end region 36 of the right supporting frame member 34 is coupled to the lower right strap 52. In some examples, the lower left attachment assembly 42 and the lower right attachment assembly 50 are fixedly attached to the left end region 22 and the right end region 24, respectively. In other examples, the lower left attachment assembly 42 and the lower right attachment assembly 50 may be releasably attached to the left end region 22 and the right end region 24, respectively, such as via a ladder lock with hook, a clip or other attachment hardware to an optional auxiliary attachment structure 78 attached to the elongate rear segment 20.

The lower left attachment assembly 42 further comprises a lower left attachment 46 that is operatively coupled to the lower left strap 44 and that is configured to engage a lower region 48 of the vehicle 12. Similarly, the lower right attachment assembly 50 further comprises a lower right attachment 55 that is operatively coupled to the lower right strap 52 and that is configured to engage a lower region 48 of the vehicle 12. Examples of lower left and lower right attachments include flat hooks configured to engage an edge of the vehicle 12. Examples of lower region structures to which the lower left strap 44 and the lower right strap 52 may be selectively coupled include the vehicle's undercarriage, a bottom edge of a vehicle door, the vehicle frame, a bottom edge of a vehicle body panel, a wheel, a wheel well, a fender, a fender flare, and the like.

The lower left attachment assembly 42 is configured to be selectively lengthened and shortened between the lower left attachment 46 and the left end region 22 of the elongate rear segment 20, and the lower right attachment assembly 50 is configured to be selectively lengthened and shortened between the lower right attachment 55 and the right end region 24 of the elongate rear segment 20.

The upper left attachment assembly 54 extends from the left end region 22 of the elongate rear segment 20 of the main frame member 16 of the inflatable frame assembly 14 and is configured to be selectively secured to an upper region 56 of the vehicle 12. Similarly, the upper right attachment assembly 58 extends from the right end region 24 of the elongate rear segment 20 of the main frame member 16 of the inflatable frame assembly 14 and is configured to be selectively secured to the upper region 56 of the vehicle 12. Examples of upper region structures to which the upper left attachment assembly 54 and the upper right attachment assembly 58 may be selectively coupled include a top edge of a vehicle door, a roof rack, a rain gutter, a tab, a roof rail, a roof channel, a factory roof rack and the like. Additionally or alternatively, a vehicle awning 10 may be provided with aftermarket attachment structures that are selectively coupled to the vehicle 12 by a user. For example, an adhesive backed or magnet-mounted anchor, such as a D-ring assembly, may be coupled to the vehicle's roof, sidewall, or door. In such examples, the upper left attachment assembly 54 and/or the upper right attachment assembly 58 may comprise one or more of a hook, a carabiner, a clip, a strap, webbing, a ladder lock, a buckle, a magnet, etc.

In some examples, the upper left attachment assembly 54 and/or the upper right attachment assembly 58 may be selectively adjusted in length. In some examples, the upper left attachment assembly 54 and/or the upper right attachment assembly 58 may be fixedly coupled to the elongate rear segment 20. In other examples, the upper left attachment assembly 54 and/or the upper right attachment assembly 58 may be releasably attached to the elongate rear segment 20, such as via a ladder lock with hook, a clip or other attachment hardware, to an optional auxiliary attachment structure 78 attached to the elongate rear segment 20. In some such examples, the location of attachment of the upper left attachment assembly 54 and/or the upper right attachment assembly 58 along the elongate rear segment 20 may be selected by a user, such as depending on the specific installation method, vehicle, etc.

Accordingly, when the lower left attachment 46 and the lower right attachment 55 are operatively coupled to the lower region 48 of a vehicle 12, and when the upper left attachment assembly 54 and the upper right attachment assembly 58 are operatively coupled to the upper region 56 of the vehicle 12, shortening the lower left attachment assembly 42 and the lower right attachment assembly 50 will cinch the lower left strap 44 and the lower right strap 52 taught to secure the vehicle awning 10 to the vehicle 12. For example, the lower left and right attachment assemblies may comprise one or more ladder locks 106 operatively coupled to the lower left and lower right straps. When present, the ladder locks 106 provide for adjustment of the length of the straps 44, 52 between the lower left and lower right attachments 46, 55 and the elongate rear segment 20.

In some examples of vehicle awnings 10, and as schematically illustrated in FIG. 1, the vehicle awning 10 has a deployed configuration 100, in which the main frame member 16, the left supporting frame member 30, and the right supporting frame member 34 are holding pressurized air and the canopy 38 is taught across the space 18, and a stowed configuration 102, in which the main frame member 16, the left supporting frame member 30, and the right supporting frame member 34 are open to atmosphere and are able to be folded and/or rolled for stowing the vehicle awning 10.

Accordingly, a vehicle awning 10 may be provided with a storage bag 80, sized such that the vehicle awning 10 is configured to fit fully within the storage bag 80 when in the stowed configuration 102, as schematically represented in FIG. 1.

In some examples of vehicle awnings 10, the main frame member 16 further comprises a front segment 60 that interconnects the left projecting segment 26 and the right projecting segment 28, and the main frame member 16 (including the front segment 60) fully bounds the space 18. In some examples, such as depending on the size of a vehicle awning 10 and the canopy 38 thereof, the main frame member 16 may comprise one or more central projecting segments 61 that extend from the elongate rear segment 20 between the left projecting segment 26 and the right projecting segment 28. In examples that also comprise a front segment 60, the one or more central projecting segments 61 may extend fully between the elongate rear segment 20 and the front segment 60. Additionally or alternatively, in some examples, one or more central projecting segments 61 may extend from and/or between the left projecting segment 26 and the right projecting segment 28. In the schematic representation of FIG. 1, the main frame member 16, the canopy 38, and the space 18 are generally rectangular in shape; however, this is not required for all examples of vehicle awnings 10. For example, the segments of the main frame member 16 may define a semi-circular shape, a trapezoidal shape, etc. Additionally, while the segments of the main frame member 16 may generally be straight, they also may be curved.

In some examples, the segments of the main frame member 16 may comprise a single bladder. In other instances one of more of the segments may have their own discrete bladder that is fluidically coupled to an adjacent segment.

In some examples of vehicle awnings 10, the main frame member 16, the left supporting frame member 30, and the right supporting frame member 34 are fluidly interconnected to define a single internal volume 62. In some such examples, the inflatable frame assembly 14 further comprises a left connecting tube 64 that fluidly interconnects the left projecting segment 26 and the left supporting frame member 30, a right connecting tube 66 that fluidly interconnects the right projecting segment 28 and the right supporting frame member 34, a left valve 68 that is operatively coupled to the left connecting tube 64 and that is configured to selectively restrict and permit air flow between the left projecting segment 26 and the left supporting frame member 30, and a right valve 70 that is operatively coupled to the right connecting tube 66 and that is configured to selectively restrict and permit air flow between the right projecting segment 28 and the right supporting frame member 34. Examples of left and right valves include pinch valves and clamps that are configured to selectively pinch and release the left and right connecting tubes.

In one example, deploying vehicle awnings 10 begins with the inflatable frame assembly 14 deflated, the left and right valves are selectively closed to restrict air flow into the left and right supporting frame members. The remainder of the inflatable frame assembly 14 is pressurized with the valves closed. Then the elongate rear segment 20 of the main frame member 16 is attached to the vehicle 12 with the left and right supporting frame members deflated. Only once the rear segment 20 is attached to the vehicle 12, are the left and right valves selectively opened to permit air flow into the left and right supporting frame members. As a result, a volume of air enters the left and right supporting frame members and equalizes with the pressure of the remainder of the inflatable frame assembly 14, and the distal end regions of the left and right supporting frame members operatively engage the vehicle 12 and thereby raise the main frame member 16 and the canopy 38 into an operative position.

In some examples of vehicle awnings 10, the left-support distal end region 32 of the left supporting frame member 30 is slidingly coupled to the lower left strap 44 and is configured to be selectively positioned along the lower left strap 44. Similarly, in such examples, the right-support distal end region 36 is slidingly coupled to the lower right strap 52 and is configured to be selectively positioned along the lower right strap 52. Accordingly, an operative position of the distal end regions of the left and right supporting frame members may be selected. For example, to engage the distal end regions of the left and right supporting frame members with a particular structure or region of the vehicle 12, to adjust the angle of the main frame member 16 and the canopy 38 relative to the vehicle, and so forth.

In some such examples of vehicle awnings 10, the left-support distal end region 32 comprises a left loop 72 and the lower left strap 44 slidingly extends through the left loop 72. Similarly, in such examples, the right-support distal end region 36 comprises a right loop 74 and the lower right strap 52 slidingly extends through the right loop 74. The left and right loops may be constructed of nylon or other fabric material and be sized and shaped to operatively receive the lower left and lower right straps in a sliding arrangement. In some examples of vehicle awnings 10, the distal end regions of the left and right supporting frame members additionally or alternatively may comprise a pocket 110 into which a magnet may be positioned for operative attachment of the distal end regions of the left and right supporting members to the vehicle 12. The distal end regions of the left and right supporting members, including optional left and right loops and optional left and right pockets may be constructed of a soft material, such as a fabric having a plush, nap, pile, fleece, flannel, or other material that will not scratch the vehicle's body.

In some examples of vehicle awnings 10 in which left supporting frame member 30 and the right supporting frame member 34 are slidingly coupled to the lower left strap 44 and the lower right strap 52, respectively, the lower left attachment assembly 42 further comprises one or more left-strap limiting structures 82 that are configured to be selectively positioned along the lower left strap 44 to retain the left-support distal end region 32 of the left supporting frame member 30 in a selected position along the lower left strap 44. Similarly, in such examples, the lower right attachment assembly 50 further comprises one or more right-strap limiting structures 84 that are configured to be selectively positioned along the lower right strap 52 to retain the right-support distal end region 36 in a selected positon along the lower right strap 52.

In some such examples, the one or more left-strap limiting structures 82 may comprise a first left-strap limiting slider 86 that is slidingly coupled to the lower left strap 44 on one side of the left-support distal end region 32, and a second left-strap limiting slider 88 that is slidingly coupled to the lower left strap 44 on an opposite side of the left-support distal end region 32 from the first left-strap limiting slider 86. Similarly, in such examples, the one or more right-strap limiting structures 84 may comprise a first right-strap limiting slider 90 that is slidingly coupled to the lower right strap 52 on one side of the right-support distal end region 36, and a second right-strap limiting slider 92 that is slidingly coupled to the lower right strap 52 on an opposite side of the right-support distal end region 36 from the first right-strap limiting slider 90. Examples of limiting sliders include friction lock hardware, such as ladder locks, sliding buckles, etc. configured to be selectively positioned along a length of the lower left and lower right straps. In some instances, the limiting sliders may be positioned to engage the distal end regions, including the left and right loops thereof, of the left and right supporting frame members.

Some examples of vehicle awnings 10 further comprise a handle 76 that is coupled to the canopy 38 within the space 18. That is, the handle 76, when present, is coupled to an underside of the canopy 38. Accordingly, in an example installation method, the handle 76 may be used to selectively position the vehicle awning 10 for operative attachment to the vehicle 12, such as following initial inflation of the main frame member 16.

In some examples of vehicle awnings 10, the attachment system 40 further comprises one or more auxiliary attachment structures 78 that are coupled to the inflatable frame assembly 14 and/or to the canopy 38 for operative attachment of various component parts of the attachment system 40 or accessories for the vehicle awning 10. In some examples, one or more auxiliary attachment structures 78 are coupled to the elongate rear segment 20 and are configured to operatively secure the elongate rear segment 20 relative to the upper region 56 of the vehicle 12. Examples of auxiliary attachment structures 78 include (but are not limited to) daisy chains, webbing, D-rings, clips, buckles, Molle straps, magnets, suction cups, etc. Such structures may extend longitudinally along a segment or member of the inflatable frame assembly 14, and/or may extend around a segment or member of the inflatable frame assembly 14. Discrete auxiliary attachment structures 78 may be placed at various locations along the members and/or segments of the inflatable frame assembly 14.

Some vehicle awnings 10 also may comprise one or more vehicle anchors 108, such as including a D-ring, a buckle, a clip, or the like, that are configured to be selectively attached to the vehicle 12 for operative coupling of the attachment system 40 thereto. In some examples, a vehicle anchor 108 may comprise a magnet to magnetically attach the vehicle anchor to a vehicle 12. In some examples, a vehicle anchor 108 may comprise an adhesive to adhesively attach to a vehicle 12.

Turning now to FIGS. 2-7, an illustrative non-exclusive example of a vehicle awning 10 in the form of vehicle awning 150 is illustrated. Vehicle awning 150 is an example of a vehicle awning 10 whose main frame member 16 comprises a front segment 60 that interconnects the left projecting segment 26 and the right projecting segment 28, such that main frame member 16 fully bounds the space 18, across which the canopy 38 spans. Additionally, vehicle awning 150 comprises a left connecting tube 64 and a right connecting tube 66. Also, the main frame member 16, the left connecting tube 64, the left supporting frame member 30, the right connecting tube 66, and the right supporting frame member 34 are all fluidly interconnected to define a single internal volume 62. Accordingly, the inflatable frame assembly 14 may be operatively inflated with a single pumping operation.

Figure 7:
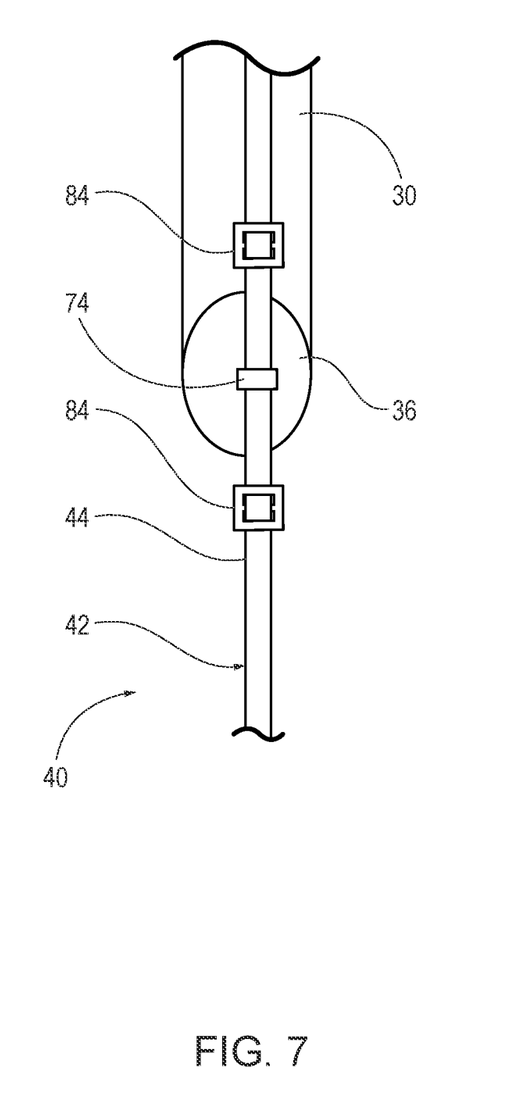
FIG. 7 is an end view of a distal end region of a supporting frame member of the example vehicle awning of FIG. 2.

As shown in FIG. 7, the left-support distal end region 32 of the left supporting frame member 30 comprises a left loop 72, through which the lower left strap 44 slidingly extends, and the right-support distal end region 36 of the right supporting frame member 34 comprises a right loop 74, through which the lower right strap 52 slidingly extends.

Figure 8:
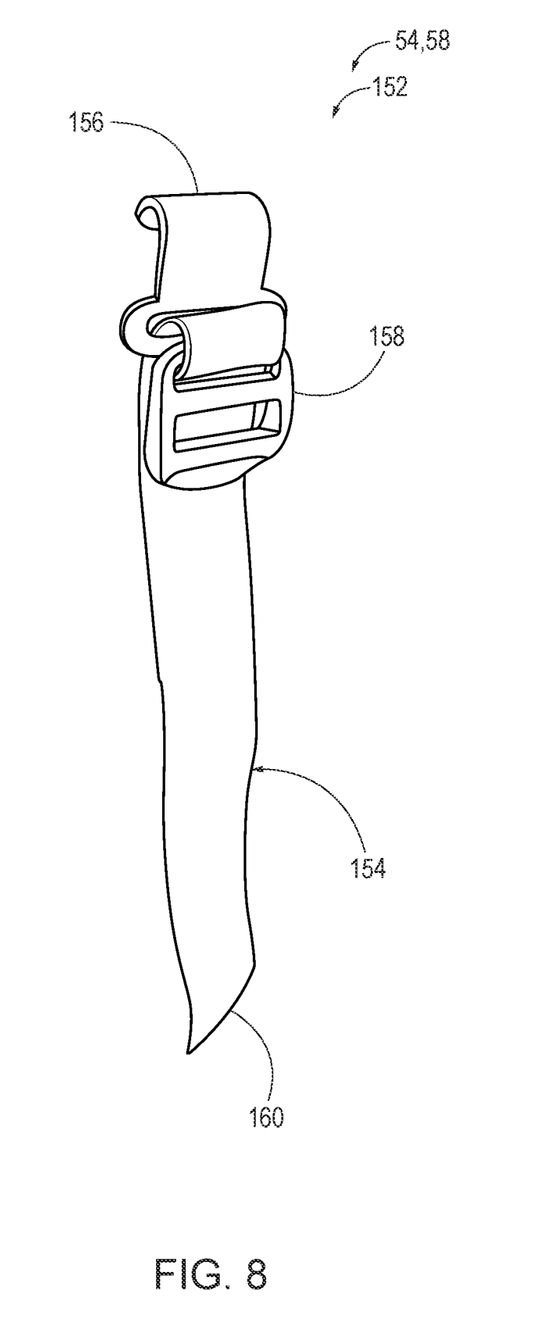
FIG. 8 is an illustration of an example upper attachment assembly for use with a vehicle awning according to the present disclosure.

In FIG. 8, an example of an upper attachment assembly 54, 58 is illustrated in the form of upper attachment assembly 152. Upper attachment assembly 152 comprises a webbing 154, a flat hook 156 fixed to one end of the webbing 154, and a ladder lock 158 for adjusting a length of the upper attachment assembly 152. Upper attachment assembly 152 is configured for use with an upper region 56 of a vehicle 12 in the form of a body panel edge, such as the top of a vehicle sliding or hinged door. Adjacent to the flat hook 156, the webbing 154 is doubled in thickness to provide a rigidity. First, a free end 160 of the webbing 154 is looped through a corresponding auxiliary attachment structure 78, such as a loop of a daisy chain, on the elongate rear segment 20 of the main frame member 16. The free end 160 is then fed through the ladder lock 158 to secure the upper attachment assembly 152 to the auxiliary attachment structure 78. Next, the vehicle awning is guided using the handle 76 to position the flat hook 156 over the body panel edge of the vehicle. The portion of the webbing 154 that is doubled in thickness restricts the webbing 154 from flopping over while a user positions the flat hook appropriately.

Figure 9:
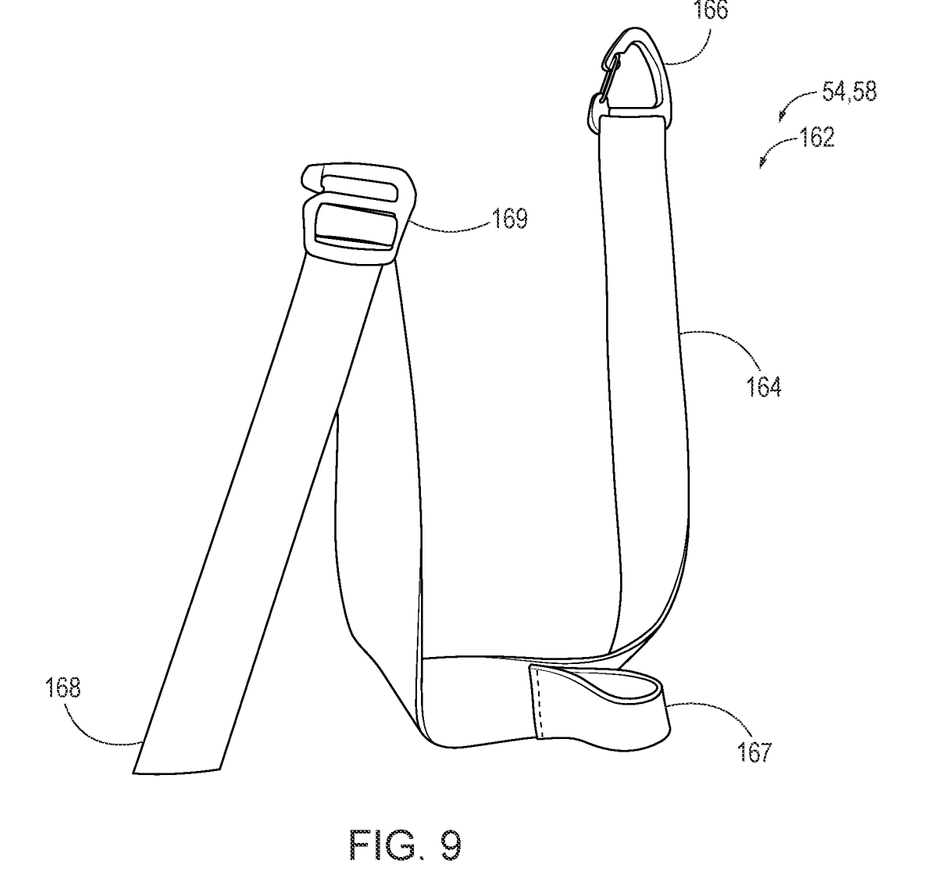
FIG. 9 is an illustration of another example upper attachment assembly for use with a vehicle awning according to the present disclosure.

In FIG. 9, an example of an upper attachment assembly 54, 58 is illustrated in the form of upper attachment assembly 162. Upper attachment assembly 162 comprises a webbing 164, a clip or carabiner 166 fixed to one end of the webbing 164, and a combination ladder lock with hook 169. A loop 167 is formed in the webbing 164 between the clip 166 and the combination ladder lock with hook 169. A D-ring also could be used in addition or as an alternative to the loop 167 in the webbing 164. Upper attachment assembly 162 may be used with an upper region 56 of a vehicle 12 in the form of a roof rack or other upper region 56 of a vehicle 12 with suitable attachment structure. To install, first, the hook of the combination ladder lock with hook 169 is coupled to a corresponding auxiliary attachment structure 78, such as a loop of a daisy chain, a webbing, a ladder lock, or other component on the elongate rear segment 20 of the main frame member 16. In some installations, the clip 166 is clipped to a roof rack or other upper region 56 of a vehicle 12, and the ladder lock of the combination ladder lock with hook 169 is adjusted to cinch the elongate rear segment 20 against the vehicle 12. In other installations, the clip 166 is fed or wrapped around a roof rack bar, tower, or other larger structure of upper region 56 of vehicle 12 and then clipped to the loop 167, and the ladder lock of the combination ladder lock with hook 169 is adjusted to cinch the elongate rear segment 20 against the vehicle 12.

Figure 10:
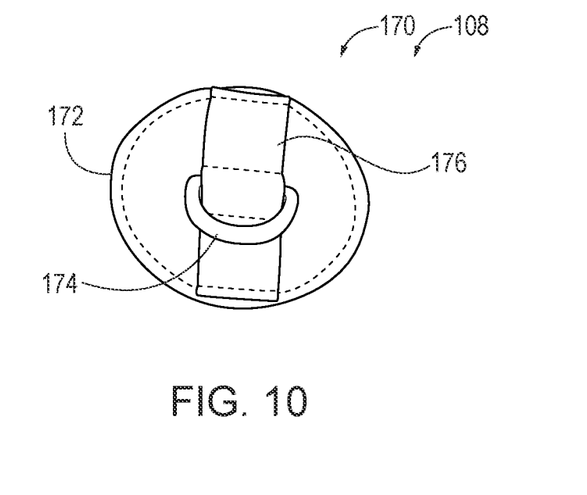
FIG. 10 is an example of a vehicle anchor for use with a vehicle awning according to the present disclosure.

In FIG. 10, an example of a vehicle anchor 108 is illustrated in the form of vehicle anchor 170. Vehicle anchor 170 comprises an adhesive-backed disc 172 and a D-ring 174 coupled thereto via a loop of webbing 176. Accordingly, the vehicle anchor 170 may be adhered to a vehicle, such as on a roof or a side panel, and then an upper attachment assembly 54, 58, such as the upper attachment assembly 162 of FIG. 9, may be operatively clipped to the D-ring 174.

Figure 11:
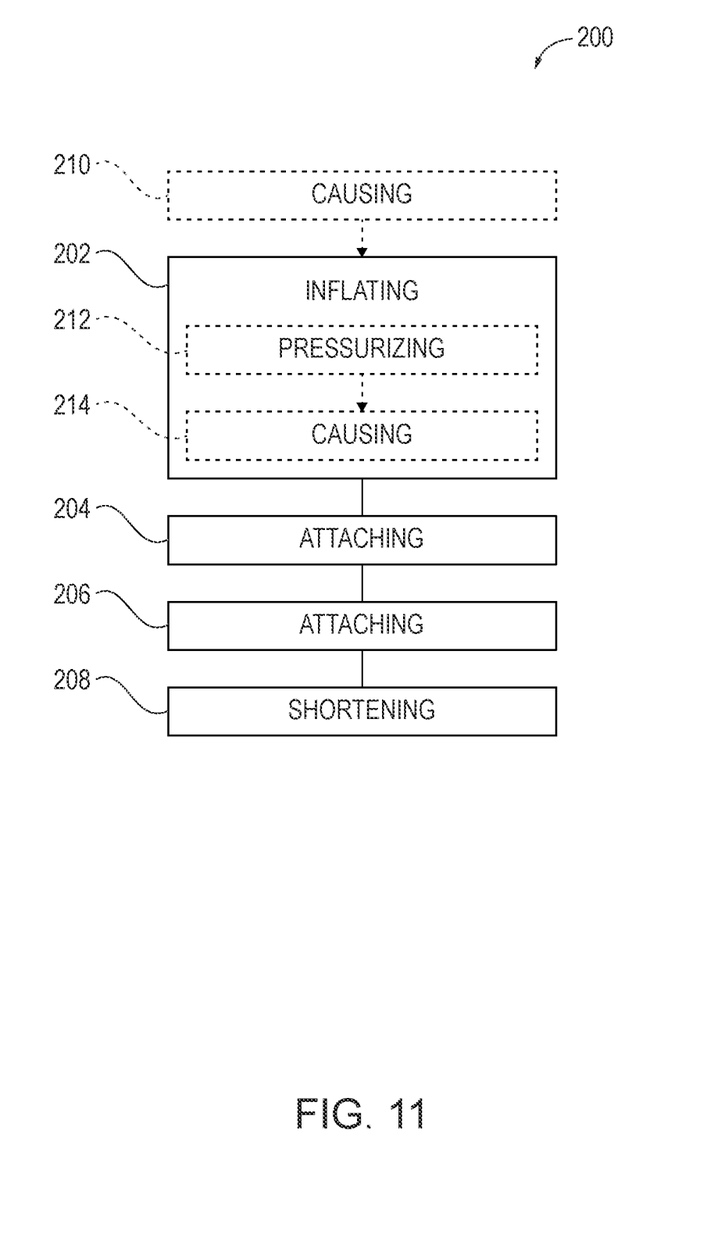
FIG. 11 is a flowchart schematically representing methods according to the present disclosure.

FIG. 11 schematically provides a flowchart that represents illustrative, non-exclusive examples of methods according to the present disclosure. In FIG. 11, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 11 are not limiting and other methods and steps are within the scope of the present disclosure, including methods having greater than or fewer than the number of steps illustrated, as understood from the discussions herein.

As schematically represented in FIG. 11, methods 200 of installing a vehicle awning 10 on a vehicle 12 comprising inflating 202 the inflatable frame assembly 14 so that the canopy 38 is taught across the space 18, operatively attaching 204 the upper left attachment assembly 54 and the upper right attachment assembly 58 to an upper region 56 of the vehicle 12, operatively attaching 206 the lower left attachment 46 and the lower right attachment 55 to the lower region 48 of the vehicle 12, and shortening 208 the lower left attachment assembly 42 and the lower right attachment assembly 50 so that the lower left strap 44 and the lower right strap 52 are taught.

When installing a vehicle awning 10 that comprises a left connecting tube 64 with a left valve 68 and a right connecting tube 66 with a right valve 70, some methods 200 further comprise prior to the inflating 202, causing 210 the left valve 68 to restrict air flow through the left connecting tube 64 and the right valve 70 to restrict air flow through the right connecting tube 66. In such methods 200, the inflating 202 comprises pressurizing 212 the main frame member 16 and, following the pressurizing 212, causing 214 the left valve 68 to permit air flow through the left connecting tube 64 and the right valve 70 to permit air flow through the right connecting tube 66, thereby pressurizing the left supporting frame member 30 and the right supporting frame member 34.

Illustrative, non-exclusive examples of inventive subject matter according to the present disclosure are described in the following enumerated paragraphs:

A. A vehicle awning (10) for installation on a vehicle (12), comprising:
an inflatable frame assembly (14), comprising:
  a main frame member (16) defining a space (18) at least partially bound by the main frame member (16) and comprising:
    an elongate rear segment (20) having a left end region (22) and a right end region (24);
    a left projecting segment (26) extending from the left end region (22) of the elongate rear segment (20); and
    a right projecting segment (28) extending from the right end region (24) of the elongate rear segment (20);
  a left supporting frame member (30) extending from the left projecting segment (26) and having a left-support distal end region (32); and
  a right supporting frame member (34) extending from the right projecting segment (28) and having a right-support distal end region (36), wherein each of the main frame member (16), the left supporting frame member (30), and the right supporting frame member (34) is configured to selectively hold a pressurized volume of air;
a canopy (38) operatively coupled to the main frame member (16) and spanning the space (18); and
an attachment system (40), comprising:
  a lower left attachment assembly (42) comprising a lower left strap (44) extending from the left end region (22) of the elongate rear segment (20) and a lower left attachment (46) operatively coupled to the lower left strap (44) and configured to engage a lower region (48) of the vehicle (12), wherein the left-support distal end region (32) is coupled to the lower left strap (44), and wherein the lower left attachment assembly (42) is configured to be selectively lengthened and shortened between the lower left attachment (46) and the left end region (22) of the elongate rear segment (20);
  a lower right attachment assembly (50) comprising a lower right strap (52) extending from the right end region (24) of the elongate rear segment (20) and a lower right attachment (55) operatively coupled to the lower right strap (52) and configured to engage the lower region (48) of the vehicle (12), wherein the right-support distal end region (36) is coupled to the lower right strap (52), and wherein the lower right attachment assembly (50) is configured to be selectively lengthened and shortened between the lower right attachment (55) and the right end region (24) of the elongate rear segment (20);
  an upper left attachment assembly (54) extending from the left end region (22) of the elongate rear segment (20) and configured to be selectively secured to an upper region (56) of the vehicle (12); and
  an upper right attachment assembly (58) extending from the right end region (24) of the elongate rear segment (20) and configured to be selectively secured to the upper region (56) of the vehicle (12).

A1. The vehicle awning (10) of paragraph A, wherein the vehicle awning (10) has:
a deployed configuration (100), in which the main frame member (16), the left supporting frame member (30), and the right supporting frame member (34) are holding pressurized air and the canopy (38) is taught across the space (18); and
a stowed configuration (102), in which the main frame member (16), the left supporting frame member (30), and the right supporting frame member (34) are open to atmosphere and are able to be folded and/or rolled for stowing the vehicle awning (10).

A1.1. The vehicle awning (10) of paragraph A1 in combination with a storage bag (80), wherein the vehicle awning (10) is configured to fit fully within the storage bag (80) when in the stowed configuration (102).

A2. The vehicle awning (10) of any of paragraphs A-A1.1, wherein the main frame member (16) further comprises a front segment (60) that interconnects the left projecting segment (26) and the right projecting segment (28), and wherein the main frame member (16) fully bounds the space (18).

A3. The vehicle awning (10) of any of paragraphs A-A2, wherein the main frame member (16), the left supporting frame member (30), and the right supporting frame member (34) are fluidly interconnected to define a single internal volume (62).

A3.1. The vehicle awning (10) of paragraph A3, wherein the inflatable frame assembly (14) further comprises:
- a left connecting tube (64) fluidly interconnecting the left projecting segment (26) and the left supporting frame member (30);
- a right connecting tube (66) fluidly interconnecting the right projecting segment (28) and the right supporting frame member (34);
- a left valve (68) operatively coupled to the left connecting tube (64) and configured to selectively restrict and permit air flow between the left projecting segment (26) and the left supporting frame member (30); and
- a right valve (70) operatively coupled to the right connecting tube (66) and configured to selectively restrict and permit air flow between the right projecting segment (28) and the right supporting frame member (34).

A4. The vehicle awning (10) of any of paragraphs A-A3.1,
- wherein the left-support distal end region (32) is slidingly coupled to the lower left strap (44) and is configured to be selectively positioned along the lower left strap (44); and
- wherein the right-support distal end region (36) is slidingly coupled to the lower right strap (52) and is configured to be selectively positioned along the lower right strap (52).

A4.1. The vehicle awning (10) of paragraph A4,
- wherein the left-support distal end region (32) comprises a left loop (72) and the lower left strap (44) slidingly extends through the left loop (72); and
- wherein the right-support distal end region (36) comprises a right loop (74) and the lower right strap (52) slidingly extends through the right loop (74).

A4.2. The vehicle awning (10) of any of paragraphs A4-A4.1,
- wherein the lower left attachment assembly (42) further comprises one or more left-strap limiting structures (82) configured to be selectively positioned along the lower left strap (44) to retain the left-support distal end region (32) in a selected position along the lower left strap (44); and wherein the lower right attachment assembly (50) further comprises one or more right-strap limiting structures (84) configured to be selectively positioned along the lower right strap (52) to retain the right-support distal end region (36) in a selected positon along the lower right strap (52).

A4.2.1. The vehicle awning (10) of paragraph A4.2,
- wherein the one or more left-strap limiting structures (82) comprise:
  - a first left-strap limiting slider (86) slidingly coupled to the lower left strap (44) on one side of the left-support distal end region (32); and
  - a second left-strap limiting slider (88) slidingly coupled to the lower left strap (44) on an opposite side of the left-support distal end region (32) from the first left-strap limiting slider (86); and
- wherein the one or more right-strap limiting structures (84) comprise:
  - a first right-strap limiting slider (90) slidingly coupled to the lower right strap (52) on one side of the right-support distal end region (36); and
  - a second right-strap limiting slider (92) slidingly coupled to the lower right strap (52) on an opposite side of the right-support distal end region (36) from the first right-strap limiting slider (90).

A5. The vehicle awning (10) of any of paragraphs A-A4.2.1, further comprising a handle (76) coupled to the canopy (38) within the space (18).

A6. The vehicle awning (10) of any of paragraphs A-A5, wherein the attachment system (40) further comprises one or more auxiliary attachment structures (78) coupled to the elongate rear segment (20), wherein the one or more auxiliary attachment structures (78) are configured to operatively secure the elongate rear segment (20) relative to the upper region (56) of the vehicle (12).

B. A method (200) of installing the vehicle awning (10) of any of paragraphs A-A6 on the vehicle (12), the method (200) comprising:
- inflating (202) the inflatable frame assembly (14) so that the canopy (38) is taught across the space (18);
- operatively attaching (204) the upper left attachment assembly (54) and the upper right attachment assembly (58) to the upper region (56) of the vehicle (12);
- operatively attaching (206) the lower left attachment (46) and the lower right attachment (55) to the lower region (48) of the vehicle (12); and
- shortening (208) the lower left attachment assembly (42) and the lower right attachment assembly (50) so that the lower left strap (44) and the lower right strap (52) are taught.

B1. The method (200) of paragraph B when depending from paragraph A3.1, further comprising:
- prior to the inflating (202), causing (210) the left valve (68) to restrict air flow through the left connecting tube (64) and the right valve (70) to restrict air flow through the right connecting tube (66);
- wherein the inflating (202) comprises:
  - pressurizing (212) the main frame member (16); and
  - following the pressurizing (212), causing (214) the left valve (68) to permit air flow through the left connecting tube (64) and the right valve (70) to permit air flow through the right connecting tube (66), thereby pressurizing the left supporting frame member (30) and the right supporting frame member (34).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A vehicle awning (10) for installation on a vehicle (12), comprising:
    an inflatable frame assembly (14), comprising:
        a main frame member (16) defining a space (18) at least partially bound by the main frame member (16) and comprising:
            an elongate rear segment (20) having a left end region (22) and a right end region (24);
            a left projecting segment (26) extending from the left end region (22) of the elongate rear segment (20); and
            a right projecting segment (28) extending from the right end region (24) of the elongate rear segment (20);
        a left supporting frame member (30) extending from the left projecting segment (26) and having a left-support distal end region (32); and
        a right supporting frame member (34) extending from the right projecting segment (28) and having a right-support distal end region (36), wherein each of the main frame member (16), the left supporting frame member (30), and the right supporting frame member (34) is configured to selectively hold a pressurized volume of air;
    a canopy (38) operatively coupled to the main frame member (16) and spanning the space (18); and
    an attachment system (40), comprising:
        a lower left attachment assembly (42) comprising a lower left strap (44) extending from the left end region (22) of the elongate rear segment (20) and a lower left attachment (46) operatively coupled to the lower left strap (44) and configured to engage a lower region (48) of the vehicle (12), wherein the left-support distal end region (32) is coupled to the lower left strap (44), and wherein the lower left attachment assembly (42) is configured to be selectively lengthened and shortened between the lower left attachment (46) and the left end region (22) of the elongate rear segment (20);
        a lower right attachment assembly (50) comprising a lower right strap (52) extending from the right end region (24) of the elongate rear segment (20) and a lower right attachment (55) operatively coupled to the lower right strap (52) and configured to engage the lower region (48) of the vehicle (12), wherein the right-support distal end region (36) is coupled to the lower right strap (52), and wherein the lower right attachment assembly (50) is configured to be selectively lengthened and shortened between the lower right attachment (55) and the right end region (24) of the elongate rear segment (20);
        an upper left attachment assembly (54) extending from the left end region (22) of the elongate rear segment (20) and configured to be selectively secured to an upper region (56) of the vehicle (12); and
        an upper right attachment assembly (58) extending from the right end region (24) of the elongate rear segment (20) and configured to be selectively secured to the upper region (56) of the vehicle (12).

2. The vehicle awning (10) of claim 1, wherein the vehicle awning (10) has:
    a deployed configuration (100), in which the main frame member (16), the left supporting frame member (30), and the right supporting frame member (34) are holding pressurized air and the canopy (38) is taught across the space (18); and
    a stowed configuration (102), in which the main frame member (16), the left supporting frame member (30), and the right supporting frame member (34) are open to atmosphere and are able to be folded and/or rolled for stowing the vehicle awning (10).

3. The vehicle awning (10) of claim 2 in combination with a storage bag (80), wherein the vehicle awning (10) is configured to fit fully within the storage bag (80) when in the stowed configuration (102).

4. The vehicle awning (10) of claim 1, wherein the main frame member (16) further comprises a front segment (60) that interconnects the left projecting segment (26) and the right projecting segment (28), and wherein the main frame member (16) fully bounds the space (18).

5. The vehicle awning (10) of claim 1, wherein the main frame member (16), the left supporting frame member (30), and the right supporting frame member (34) are fluidly interconnected to define a single internal volume (62).

6. The vehicle awning (10) of claim 5, wherein the inflatable frame assembly (14) further comprises:
    a left connecting tube (64) fluidly interconnecting the left projecting segment (26) and the left supporting frame member (30);
    a right connecting tube (66) fluidly interconnecting the right projecting segment (28) and the right supporting frame member (34);
    a left valve (68) operatively coupled to the left connecting tube (64) and configured to selectively restrict and permit air flow between the left projecting segment (26) and the left supporting frame member (30); and
    a right valve (70) operatively coupled to the right connecting tube (66) and configured to selectively restrict and permit air flow between the right projecting segment (28) and the right supporting frame member (34).

7. The vehicle awning (10) of claim 1,
wherein the left-support distal end region (32) is slidingly coupled to the lower left strap (44) and is configured to be selectively positioned along the lower left strap (44); and
wherein the right-support distal end region (36) is slidingly coupled to the lower right strap (52) and is configured to be selectively positioned along the lower right strap (52).

8. The vehicle awning (10) of claim 7,
wherein the left-support distal end region (32) comprises a left loop (72) and the lower left strap (44) slidingly extends through the left loop (72); and
wherein the right-support distal end region (36) comprises a right loop (74) and the lower right strap (52) slidingly extends through the right loop (74).

9. The vehicle awning (10) of claim 7,
wherein the lower left attachment assembly (42) further comprises one or more left-strap limiting structures (82) configured to be selectively positioned along the lower left strap (44) to retain the left-support distal end region (32) in a selected position along the lower left strap (44); and
wherein the lower right attachment assembly (50) further comprises one or more right-strap limiting structures (84) configured to be selectively positioned along the lower right strap (52) to retain the right-support distal end region (36) in a selected position along the lower right strap (52).

10. The vehicle awning (10) of claim 9,
wherein the one or more left-strap limiting structures (82) comprise:
a first left-strap limiting slider (86) slidingly coupled to the lower left strap (44) on one side of the left-support distal end region (32); and
a second left-strap limiting slider (88) slidingly coupled to the lower left strap (44) on an opposite side of the left-support distal end region (32) from the first left-strap limiting slider (86); and
wherein the one or more right-strap limiting structures (84) comprise:
a first right-strap limiting slider (90) slidingly coupled to the lower right strap (52) on one side of the right-support distal end region (36); and
a second right-strap limiting slider (92) slidingly coupled to the lower right strap (52) on an opposite side of the right-support distal end region (36) from the first right-strap limiting slider (90).

11. The vehicle awning (10) of claim 1, further comprising a handle (76) coupled to the canopy (38) within the space (18).

12. The vehicle awning (10) of claim 1, wherein the attachment system (40) further comprises one or more auxiliary attachment structures (78) coupled to the elongate rear segment (20), wherein the one or more auxiliary attachment structures (78) are configured to operatively secure the elongate rear segment (20) relative to the upper region (56) of the vehicle (12).

13. A method (200) of installing the vehicle awning (10) of claim 1 on the vehicle (12), the method (200) comprising:
inflating (202) the inflatable frame assembly (14) so that the canopy (38) is taught across the space (18);
operatively attaching (204) the upper left attachment assembly (54) and the upper right attachment assembly (58) to the upper region (56) of the vehicle (12);
operatively attaching (206) the lower left attachment (46) and the lower right attachment (55) to the lower region (48) of the vehicle (12); and
shortening (208) the lower left attachment assembly (42) and the lower right attachment assembly (50) so that the lower left strap (44) and the lower right strap (52) are taught.

14. The method (200) of claim 13, wherein:
the main frame member (16), the left supporting frame member (30), and the right supporting frame member (34) are fluidly interconnected to define a single internal volume (62);
the inflatable frame assembly (14) further comprises:
a left connecting tube (64) fluidly interconnecting the left projecting segment (26) and the left supporting frame member (30);
a right connecting tube (66) fluidly interconnecting the right projecting segment (28) and the right supporting frame member (34);
a left valve (68) operatively coupled to the left connecting tube (64) and configured to selectively restrict and permit air flow between the left projecting segment (26) and the left supporting frame member (30); and
a right valve (70) operatively coupled to the right connecting tube (66) and configured to selectively restrict and permit air flow between the right projecting segment (28) and the right supporting frame member (34); and
the method (200) further comprises prior to the inflating (202), causing (210) the left valve (68) to restrict air flow through the left connecting tube (64) and the right valve (70) to restrict air flow through the right connecting tube (66);
wherein the inflating (202) comprises:
pressurizing (212) the main frame member (16); and
following the pressurizing (212), causing (214) the left valve (68) to permit air flow through the left connecting tube (64) and the right valve (70) to permit air flow through the right connecting tube (66), thereby pressurizing the left supporting frame member (30) and the right supporting frame member (34).

15. A vehicle awning (10) for installation on a vehicle (12), comprising:
an inflatable frame assembly (14), comprising:
a main frame member (16) defining a space (18) fully bound by the main frame member (16) and comprising:
an elongate rear segment (20) having a left end region (22) and a right end region (24);
a left projecting segment (26) extending from the left end region (22) of the elongate rear segment (20);
a right projecting segment (28) extending from the right end region (24) of the elongate rear segment (20); and
a front segment (60) that interconnects the left projecting segment (26) and the right projecting segment (28);
a left supporting frame member (30) extending from the left projecting segment (26) and having a left-support distal end region (32);
a right supporting frame member (34) extending from the right projecting segment (28) and having a right-support distal end region (36);
a left connecting tube (64) fluidly interconnecting the left projecting segment (26) and the left supporting frame member (30);

a right connecting tube (66) fluidly interconnecting the right projecting segment (28) and the right supporting frame member (34), wherein the main frame member (16), the left supporting frame member (30), the right supporting frame member (34), the left connecting tube (64), and the right connecting tube (66) are fluidly interconnected to define a single internal volume (62) configured to selectively hold a pressurized volume of air;

a left valve (68) operatively coupled to the left connecting tube (64) and configured to selectively restrict and permit air flow between the left projecting segment (26) and the left supporting frame member (30); and a right valve (70) operatively coupled to the right connecting tube (66) and configured to selectively restrict and permit air flow between the right projecting segment (28) and the right supporting frame member (34);

a canopy (38) operatively coupled to the main frame (16) and spanning the space (18); and an attachment system (40), comprising:

a lower left attachment assembly (42) comprising a lower left strap (44) extending from the left end region (22) of the elongate rear segment (20) and a lower left attachment (46) operatively coupled to the lower left strap (44) and configured to engage a lower region (48) of the vehicle (12), wherein the left-support distal end region (32) is slidingly coupled to the lower left strap (44) and configured to be selectively positioned along the lower left strap (44), wherein the lower left attachment assembly (42) further comprises one or more left-strap limiting structures (82) configured to be selectively positioned along the lower left strap (44) to retain the left-support distal end region (32) in a selected position along the lower left strap (44), and wherein the lower left attachment assembly (42) is configured to be selectively lengthened and shortened between the lower left attachment (46) and the left end region (22) of the elongate rear segment (20);

a lower right attachment assembly (50) comprising a lower right strap (52) extending from the right end region (24) of the elongate rear segment (20) and a lower right attachment (55) operatively coupled to the lower right strap (52) and configured to engage the lower region (48) of the vehicle (12), wherein the right-support distal end region (36) is slidingly coupled to the lower right strap (52) and is configured to be selectively positioned along the lower right strap (52), wherein the lower right attachment assembly (50) further comprises one or more right-strap limiting structures (84) configured to be selectively positioned along the lower right strap (52) to retain the right-support distal end region (36) in a selected position along the lower right strap (52), and wherein the lower right attachment assembly (50) is configured to be selectively lengthened and shortened between the lower right attachment (55) and the right end region (24) of the elongate rear segment (20);

an upper left attachment assembly (54) extending from the left end region (22) of the elongate rear segment (20) and configured to be selectively secured to an upper region (56) of the vehicle (12); and an upper right attachment assembly (58) extending from the right end region (24) of the elongate rear segment (20) and configured to be selectively secured to the upper region (56) of the vehicle (12).

* * * * *